No. 741,231. PATENTED OCT. 13, 1903.
W. H. DAVIS.
PROCESS OF TREATING CYANID SOLUTIONS.
APPLICATION FILED JULY 3, 1902.
NO MODEL.
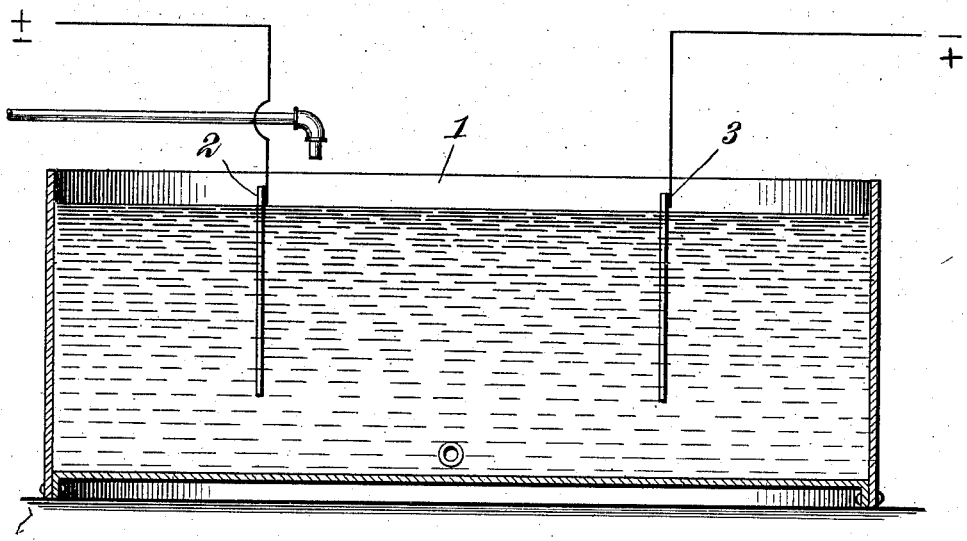
WITNESSES:
INVENTOR
William H. Davis
BY
ATTORNEYS No. 741,231.

Patented October 13, 1903.

UNITED STATES PATENT OFFICE.

WILLIAM H. DAVIS, OF BOULDER, COLORADO, ASSIGNOR OF TWO-THIRDS TO ARTHUR L. COLLINS, OF DENVER, COLORADO, AND FRANCIS L. BOSQUI, OF TELLURIDE, COLORADO.

PROCESS OF TREATING CYANID SOLUTIONS.

SPECIFICATION forming part of Letters Patent No. 741,231, dated October 13, 1903.

Application filed July 3, 1902. Serial No. 114,299. (No specimens.)

*To all whom it may concern:*

Be it known that I, WILLIAM H. DAVIS, a citizen of the United States, and a resident of Boulder, in the county of Boulder and State of Colorado, have invented a new and Improved Continuous Process for Treating Cyanid Solutions, of which the following is a full, clear, and exact description.

The invention relates to the extraction of gold and silver from ores by means of a dilute solution of sodium or potassium cyanid, commonly known as the "cyanid process."

The object of the invention is to provide a new and continuous process for treating cyanid solutions either during or subsequent to their contact with the ore, whereby the double salts in the solution are dissociated and the regeneration of the cyanid in the solution is simultaneously accomplished with the purification of the solution.

The process consists, essentially, in adding an alkaline hydrate to the contents of the storage or leaching tanks and then subjecting the mixture to the action of an alternating electric current to break up the double salts and precipitate the base metals and combine the cyanogen radical with the alkaline hydrates to form the alkaline or regenerated cyanid.

It is a well-established fact that in the practical operation of the cyanid process as now practiced the unstable compound of cyanogen with the alkaline metal readily combines with the various metallic ingredients of the ore—such as mercury, copper, arsenic, antimony, iron, aluminium, chromium, manganese, cobalt, nickel, and magnesium, to form double salts, which, while not absolutely inert as solvents of the precious metals, are far from being as efficient solvents as the original salt of sodium or potassium cyanid. It is thus evident that a considerable amount of cyanid is combined with other metals in the solution, and this amount is hence unavailable as a solvent for gold or silver—that is, the original cyanid solution is greatly impoverished—as a part of the cyanid is made unavailable by reason of its combination with the base metals and the specific gravity of the working solution is increased, and hence its action as a solvent is diminished on account of the accumulation of the base metals.

By my process, presently to be described in detail, the above defects are overcome by dissociating the double salts and by simultaneously regenerating the cyanid in the solution and purifying the latter.

The solutions to which the process may be applied are those which are immediately in contact with the ore, or it may be applied to solutions after they have been in contact with the ore, either before or after precipitation of the values. If it is found advisable to apply the process to solutions while in contact with the ore, the required alkalinity must be present in the solution and the electrodes must be suspended in the leaching-vat. In certain cases where it is found best to throw out of solution any base or bases which have a deleterious effect on precipitation, it may be advisable to use the process on such solutions before they are subjected to any of the well-known methods of precipitation; but in most cases in practice the process is applied to solutions after their values have been precipitated. Such solutions are usually gathered in what is known as the "storage-tank." These solutions may already contain an excess of sodium or calcium hydrate in sufficient quantity to combine with the liberated cyanogen. If they do not contain such excess, it becomes necessary to add to the solution in the storage-tank, at regular intervals, one of the alkaline hydrates—such as sodium, potassium, or calcium hydrate—in quantities depending upon the amount of double salts in the solution, it being understood, however, that only so much of the alkaline hydrate is added at a time as is necessary to combine with the cyanogen present to form a cyanid of the alkaline metal.

In the drawing I have shown a suitable storage or leaching tank at 1, in which are suspended two electrodes, as at 2 and 3, not prejudicially soluble in a cyanid solution, and preferably lead. Such electrodes are contained in an alternating electric current of suitable strength, predetermined according to the amount of solution in the tank. The distance apart at which the electrodes are placed is a factor of the cycle of the current and must likewise be determined for each particular case. Now the effect of the alternating current is to dissociate the double salts in solution, causing the hydrates of the metals to precipitate out. If the solution is in contact with the ore at the time of the application of the current, this precipitate can not be withdrawn, but will accumulate in the ore. If, on the other hand, the current is applied to the solution while contained in a solution-tank, the hydrates of the metals—such as mercury, copper, arsenic, antimony, iron, aluminium, chromium, manganese, cobalt, nickel, and magnesium—will fall as precipitates to the bottom of the tank. All these metals have been found by analysis to have been precipitated by the process.

The data of the alternating current used in carrying out my invention may be specified as follows: The volume of the current used may be from .01 to .04 amperes per ton of solution and the voltage in accordance with Ohms' law $\frac{P}{R} = C$. With regard to the number of cycles admissible for ordinary commercial use, from sixty to one hundred and twenty have been tried and are satisfactory.

The base precipitate, which is thrown down in the storage-tank, may be dealt with in one of three ways. If it does not accumulate in excessive quantity, it may be withdrawn from the tank by degrees with the solution and returned to the ore, inasmuch as it is very slowly redissolved and would have no deleterious effect unless the cycle of operations in the leaching-tank were unduly prolonged, or, if the precipitate accumulates rapidly, as it will in many cases, it may be caught in a filter-press, through which all the solution in the storage-tank may be forced at proper intervals, or there may be provided a series of storage-tanks where the regeneration and purification may be carried on, the contents of one tank being allowed to settle, while the contents of another tank, from which the bases have been allowed to settle out by gravity, may be drawn off by floating hose or other device, for use on the ore. The free cyanogen liberated from the double salts is combined with one of the alkaline hydrates—sodium, potassium, or calcium hydrate—whichever is found to be the most suitable, it being understood, as previously stated, that this hydrate is added to the storage-tank at regular intervals and in a quantity dependent upon the double salts in solution.

The equation upon which the chemical part of the process is based is as follows:

Let R equal any monad alkaline metal.
Let R' equal any alkaline metal or group of monad alkaline metals.
Let R'' equal any diad alkaline metal.
Let M equal a base metal, as Hg, Cu, As, Fe, Al, Cr, Zn, Mn, or Mg.
Let x equal number of combining bonds of R'.
Let y equal number of combining bonds of M.
Then

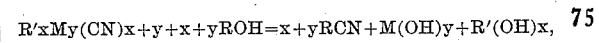

or—

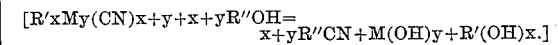

Such reaction takes place without excess of alkaline hydrate. Under the influence of the alternating current and the (x) value of alkaline hydrate the precipitation of the base metals (M) from the solution is effected.

It will be evident that from a chemical standpoint the stronger bases displace the weaker ones. After the complex molecule is broken up by physical means—that is to say, the alternating current—then and only then do the strictly chemical reactions occur. The alternating current has been found to possess in general a dissociating action.

From the foregoing it will be seen that the process is extremely simple and practicable, requiring no important addition to the original plant nor any segregation of the working solution for the purposes of special treatment.

The process is continuous and is not particularly related to the so-called "waste cyanid-liquor processes," but is designed to treat the whole bulk of cyanid solutions in a plant, which solutions are being continuously purified as they pass through their respective storage-tanks.

By the process described a simultaneous regeneration of the cyanids in solution with the purification of the solution is obtained and only a single chemical is used, which in itself can exert no deleterious effect when introduced into the working solutions. This chemical, even if added in excess, is useful to neutralize the acidity common to most ores to which the cyanid process is applied.

I wish it to be understood that wherever the term "double salts" is used the first compound in the hereinbefore-mentioned equation is meant and all base metals are included in "M."

Having thus described my invention, I claim as new and desire to secure by Letters Patent—

1. The herein-described process for treating cyanid solutions used in the extraction of precious metals from their ores, consisting in introducing an alkaline hydrate into the solution, and then subjecting the mixture to the action of an alternating electric current, substantially as and for the purpose set forth.

2. The herein-described process for treating cyanid solutions during, or subsequently to, their contact with the ore, consisting in introducing into the solution an alkaline hydrate, and then subjecting the mixture to the action of an alternating electric current, thereby raising the osmotic pressure, to dissociate the double salts in the solution, causing precipitation of the hydrates of the base metals, and to combine the freed cyanogen with the alkaline hydrates, to cause simultaneous regeneration of the cyanid in the solution and clarifying of the latter, as set forth.

In testimony whereof I have signed my name to this specification in the presence of two subscribing witnesses.

WILLIAM H. DAVIS.

Witnesses:
THOS. CONNER,
M. J. CRANDALL.